United States Patent Office 3,368,938
Patented Feb. 13, 1968

3,368,938
CONTROLLING FUNGI WITH
5-FLUOROCYTOSINE
Julius Berger, Passaic, and Robert Duschinsky, Essex
Fells, N.J., assignors to Hoffmann-La Roche Inc., Nutley, N.J., a corporation of New Jersey
No Drawing. Continuation-in-part of application Ser. No. 181,822, Mar. 22, 1962. This application Jan. 13, 1966, Ser. No. 520,371
5 Claims. (Cl. 167—58)

This application is a continuation-in-part of United States patent application Ser. No. 181,822, filed Mar. 22, 1962 (now abandoned), the latter application being a continuation-in-part of United States patent application Ser. No. 176,902, filed Mar. 2, 1962 (now abandoned).

This invention relates to the use of 5-fluorocytosine in the control of fungi. More specifically, this invention relates to the use of 5-fluorocytosine in combatting certain fungi which are pathogenic to humans, animals and plants.

It is known in the art that particular fluoropyrimidine compounds, including 5-fluorocytosine, inhibit the growth of certain bacteria. It has now been found that 5-fluorocytosine is also quite effective in inhibiting the growth of certain classes of fungi. As used herein, the term "fungi" includes both yeasts and molds. The finding that 5-fluorocytosine possesses antifungal activity is quite unexpected.

Thus, by way of example, 5-fluorocytosine has been found to be effective against the organism causing candidiasis. It is particularly effective against *Candida albicans*, the species which causes an acute or subacute infection in the mouth or throat, skin, nails, vagina, bronchi, lungs or intestinal tract. Additionally, 5-fluorocytosine is effective in inhibiting the growth of, for example, aspergilli and penicillia. More particularly, 5-fluorocytosine inhibits the growth of *Aspergillus niger*, the spoilage agent which causes considerable industrial waste and/or deterioration in food, leather, textile, paint, paper and allied industries. It is similarly effective against the spoilage agents *Aspergillus flavus, Pencillium digitatum* and *Penicillium citrinum*. In addition, 5-fluorocytosine is effective in inhibiting the growth of yeasts, such as, *Saccharomyces cerevisiae* and *Rhodotorula rubra*.

The very fact that 5-fluorocytosine possesses antifungal properties is, in and of itself, surprising. However, even more remarkable is the extent to which that compound is effective when employed for such use. For example, 5-fluorocytosine has been found to be at least ten times more effective in vitro against the organism *Candida albicans* than 5-fluorouracil. At the same time, however, 5-fluorocytosine is at least 20 times less toxic than 5-fluorouracil in the mouse and in the dog.

Thus, in its most comprehensive embodiment, the present invention resides inthe use of 5-fluorocytosine as an antifungal agent. The use of 5-fluorocytosine-containing preparations to combat systemic *Candida albicans* infections represents a preferred embodiment of the invention. In a more particular embodiment, the present invention provides compositions which contain 5-fluorocytosine as the active antifungal ingredient.

The in vitro activity of 5-fluorocytosine was tested by the agar cup-plate, diffusion assay procedure which is used in penicillin assay. This procedure is described by Donald C. Grove and William A. Randall, in the text Assay Methods of Antibiotics, published by Medical Encyclopedia Incorporated, New York, N.Y., 1955, at pages 2 to 16. In the present instance, however, fungi were used as the inoculum rather than bacteria. 5-fluorocytosine was found to give inhibition zones of 20 mm. in diameter, or greater, against *Paecilomyces varioti* and *Penicillium digitatum* at a concentration of 0.1 mg. per ml. Moreover, where a semi-synthetic agar was used in place of the complex nitrogen agar, the sensitivity of yeasts and fungi to 5-fluorocytosine was found to be extremely great. Thus, at a concentration of 0.01 mg. per ml. of solution added to the assay cylinders, zones of 20 to 37 mm. in diameter were observed against *Candida albicans, Saccharomyces cerevisiae* and against *Paecilomyces varioti* and *Penicillium digitatum*. Concentrations of 1 mg. per ml. of 5-fluorocytosine, in the semi-synthetic agar medium, produced inhibition zones of 45 to 60 mm. in diameter against *Penicillium citrinum, Aspergillus flavus* and *Aspergillus niger*. The table which follows hereinafter contains a comparison between the antifungal activity of 5-fluorocytosine and the antifungal activity of the commercially available antifungal agent which is known under the generic name Nystatin. The latter product is a polyene antifungal antibiotic produced by *Streptomyces noursei, Streptomyces aureus* and other Streptomyces species.

ANTIFUNGAL SPECTRA IN VITRO OF 5-FLUOROCYTOSINE AND NYSTATIN

All of the test organisms were grown on a semi-synthetic vitamin-salts-casein hydrolysate agar medium, at pH 5.5. The medium was prepared in the following manner: 10 mg. of pyridoxine, 10 mg. of thiamine, 1000 mg. of inositol, 100 mg. of calcium pantothenate, 0.32 mg. of d-biotin and 100 mg. of niacin were added to a sufficient quantity of water to provide 1.0 liter of a vitamin stock solution. In a separate vessel, 200 grams of dextrose (anhydrous), 2.2 grams of dibasic potassium phosphate ($KH_aPO_4$), 1.7 grams potassium chloride, 0.5 gram of $CaCl_2 \cdot 2H_2O$, 0.5 gram $MgSO_4 \cdot 7H_2O$, 0.01 gram of $FeCl_3 \cdot 6H_2O$ and 0.01 gram of $MnSO_4 \cdot H_2O$ were added to a sufficient quantity of water to provide 1.0 liter of a sugar and salts stock solution. A citrate buffer solution was also prepared separately by adding 90.0 grams of sodium citrate and 20.0 grams of citric acid to a sufficient quantity of water to provide 1.0 liter of stock solution. The desired medium was obtained by mixing 25 ml. of the aforementioned vitamin stock solution, 250 ml. of the sugar and salts stock solution, 50 ml. of the citrate buffer solution, 40 ml. of a casein hydrolysate stock solution and 15 grams of agar in a sufficient quantity of water to provide 1.0 liter of medium. The aforementioned casein hydrolysate stock solution was obtained by adding 100 grams of Sheffield N-Z amine A to a sufficient quantity of water to provide 1.0 liter of stock solution. Sheffield N-Z amine A is a casein hydrolysate produced and sold by Sheffield Chemical Company, a division of National Dairy Products Company, Norwich, N.Y. The medium was sterilized by autoclaving for 10 minutes.

The cultures which are designated in the table which follows hereinafter as Item Nos. 1, 3 and 4 were grown 18 hours at 35° C. The remaining cultures were grown at 28° C. for sufficient time to permit good growth of each organism (1–3 days).

[Diameter of inhibition zones in mm.]

| Item No. | Test Organism | Nystatin | 5-fluorocytosine | | |
|---|---|---|---|---|---|
| | | 2.0 | 0.1 | 0.02 | 0.004 |
| 1 | Saccharomyces cerevisiae | 22 | 38 | 29 | 23 |
| 2 | Rhodotorula rubra | 37 | 45 | 32 | 20 |
| 3 | Candida albicans | 30 | 33 | 27 | 13 |
| 4 | Paecilomyces varioti | 31 | 35 | 27 | 19 |
| 5 | Penicillium citrinum | 25 | 46 | 32 | 18 |
| 6 | Aspergillus flavus | 24 | 52 | 36 | 22 |
| 7 | Aspergillus niger | 27 | 49 | 42 | 23 |
| 8 | Pencillium digitatum | [1] 33 | 47 | 27 | 18 |

Mg./ml. concentration of—

[1] At 0.125 mg./ml.

It will be observed from the data set forth in the foregoing table that 5-fluorocytosine is much more effective than Nystatin, being as much as 30 to 500 times as active in various instances. Moreover, it has been found that the addition of 20% human blood to a 5-fluorocytosine solution did not materially decrease the activity of the drug against *Candida albicans*.

As will be seen from Example 1 which follows hereinafter, 5-fluorocytosine is effective, in vivo, against systemic fungal infections such as *Candida albicans* infections. Its antifungal properties, coupled with its low toxicity, render 5-fluorocytosine extremely well suited for use in the treatment of fungal infections in human, animal and plant hosts. Additionally, the properties of 5-fluorocytosine are such as to render it suitable for use in the treatment of the spoilage agents which cause industrial waste and/or deterioration of food.

From a pharmacological standpoint, 5-fluorocytosine has been found to be well suited for use in treating fungal infections in human hosts. For example, 5-fluorocytosine is not toxic; it is not metabolized; and it is quantitatively excreted in the urine. Moreover, 5-fluorocytosine becomes distributed throughout the mammal organism and it passes the brain-blood barrier. Furthermore, sustained blood levels are maintained in humans, half-life of the compound being from 7 to 10 hours.

Clinical trials have demonstrated that 5-fluorocytosine is both safe and effective in the treatment of fungal infections in humans. Five patients, who had a prior, unsuccessful history of chemotherapy, were treated for systemic fungal diseases with 5-fluorocytosine. The dose schedules varied from 1.0 gram per day, in the case of a child, to 9.0 grams per day in the case of an adult. The treatment ranged from 3 to 8 weeks. In all instances, the 5-fluorocytosine was administered in the form of 250 mg. tablets, such tablets being given orally in four divided dosages per day. Four of the patients were diagnosed as having a systemic moniliasis infection, the fifth patient having been diagnosed as having cryptococcal meningitis infection. Cryptococcal meningitis infection is caused by *Cryptococcus neoformans*. All five patients showed objective response to 5-fluorocytosine. In the case of the moniliasis patients, response to the treatment with 5-fluorocytosine was manifested by cultures of specimens, i.e., blood, urine, bronchial washings, such cultures being taken before and after therapy. In every instance, positive cultures became negative after treatment. In the case of the cryptococcal meningitis patient, microscopic examination of the cerebrospinal fluid revealed the disappearance of the fungus. In addition, clinical signs of improvement were associated with the objective observations. In all instances, 5-fluorocytosine was well tolerated. There was no toxic effect upon bone marrow, the gastrointestinal tract, liver, kidneys or central nervous system.

For pharmaceutical applications, 5-fluorocytosine can be used as is or it can be formulated into solutions or suspensions using medicinally acceptable liquid vehicles such as water or alcohol. Generally, such solutions or suspensions will contain at least about 0.1%, by weight, of 5-fluorocytosine. However, under ordinary circumstances, solutions or suspensions which are more highly concentrated with 5-fluorocytosine will be far more useful. Solutions or suspensions of 5-fluorocytosine can be administered as oral medication. In the alternative, such solutions or suspensions can be administered by injection, for example, intravenously, subcutaneously, or intraperitoneally. Local fungal infections can be treated using, for example, suppositories, ointments, salves, lozenges, etc. which contain 5-fluorocytosine as the active ingredient. Additionally, 5-fluorocytosine can be formulated into suitable solid oral dosage forms, such as hard-shell capsules, tablets, etc. In the production of 5-fluorocytosine capsules or tablets, any of the adjuvant materials, ordinarily used in formulating such products, can be used. These include, for example, fillers such as coprecipitated aluminum hydroxide-calcium carbonate, dicalcium phosphate or lactose, disintegrating agents such as maize starch, and lubricating agents such as talc, calcium stearate, etc. The quantity of 5-fluorocytosine which is incorporated into the various solid dosage forms can be varied within a very wide range. In general, the maximum permissible concentration of 5-fluorocytosine in any solid dosage form will be determined by purely technical considerations. By this it is meant that when producing, for example, tablets, only such quantities of adjuvant materials need be employed as are necessary to provide commercially suitable tablets upon compression of the mixture. Thus, depending on the nature of the adjuvant materials, the maximum amount of 5-fluorocytosine that may be incorporated in each tablet will be subject to rather wide variations.

In the treatment of fungal infections in human hosts, the frequency of administration of 5-fluorocytosine-containing compositions will vary depending upon the levels of 5-fluorocytosine present in such compositions and the needs and requirements of the patient, as diagnosed by the attending physician. As indicated therefore, dose schedules have been varied from 1.0 gram to 9.0 grams per day, the compound having been administered orally in the form of 250 mg. tablets. The foregoing notwithstanding, the dosages mentioned herein are exemplary only and they are not intended to limit the scope of practice of this invention. It will be readily apparent that, in certain instances, the administration of quantities of 5-fluorocytosine substantially less than 1.0 gram per day may be desirable whereas, in other instances, the administration of quantities of 5-fluorocytosine in excess of 9.0 grams per day may be indicated.

When 5-fluorocytosine is to be used for food preservative or agriculture purposes, it can be dissolved or suspended in a suitable solvent and the solution or suspension, thus obtained, may be sprayed onto food or onto the plant to be protected. When 5-fluorocytosine is to be employed for the preservation of industrial products, the compound can be added, as is, or suspended or dissolved in a suitable vehicle to the product. Such a technique could be utilized where the product to be protected is, for example, a paint. In the treatment of leather, textiles, paper, etc., 5-fluorocytosine could most conveniently be applied thereto in the form of a solution or suspension by spraying or soaking.

For a fuller understanding of the nature and objects of this invention, reference may be had to the following examples which are given merely as further illustrations of the invention and are not to be construed in a limiting sense.

*Example 1*

In this example, aqueous solutions containing varying concentrations of 5-fluorocytosine were prepared. Each solution was obtained by adding 5-fluorocytosine to water and dissolving same therein by mixing at room temperature. One solution, thus obtained, contained a ratio of 1 mg. of 5-fluorocytosine for each 1.0 ml. of water. A second solution contained a ratio of 2 mg. of 5-fluorocytosine for each 1.0 ml. of water. A third solution contained 4 mg. of 5-fluorocytosine for each 1.0 ml. of water. A fourth solution contained a ratio of 10 mg. of 5-fluorocytosine for each 1.0 ml. of water.

These solutions were evaluated for their effectiveness against systemic *Candida albicans* infections in white mice. The *Candida albicans* infections were established in the test animals in the following manner:

The growth from a 24 hour Sabouraud's agar slant culture of *Candida albicans* was washed from the surface of the medium in 5 ml. of saline. The suspension was spun in the centrifuge at 100 r.p.m. for 3 minutes to cause the clumps of cells to settle out at the bottom of the tube while single cells remained in the supernatant. The supernatant was decanted and the number of cells per milliliter was determined by hemocytometric count, using the technique employed for counting leukocytes, as described in the War Department Technical Manual, Methods for Laboratory Technicians, Oct. 17, 1941, pages 14 to 18. The suspension was then diluted to contain 100,000 cells of *Candida albicans* per ml.

To accomplish the reproducible infection of mice, 0.1 ml. of a 1% suspension of cortisone in saline was injected intramuscularly on the morning and afternoon of the day before infection. On the day of infection the animals received 0.1 ml. of the 1% suspension of cortisone in the morning, followed by 0.5 ml. of the 100,000 cells per ml. of *Candida albicans* intravenously. On the same afternoon a fourth treatment of cortisone was administered. Fifth and sixth injections of cortisone were administered on the morning and afternoon of the day following infection.

The treatment with 5-fluorocytosine was started on the day of infection and continued for 21 days. Negative cultures from the kidneys were the criteria used for the evaluation of antifungal effectiveness of the 5-fluorocytosine.

Control animals infected intravenously with *Candida albicans* succumbed between the seventh and fourteenth day after infection. Positive cultures were obtained from the kidney on Sabouraud's agar.

Table 2, which follows hereinafter, shows the results obtained when mice, infected intravenously with 50,000 cells of *Candida albicans,* were treated intraperitoneally and orally with aqueous solutions of 5-fluorocytosine. In the case of the 100 mg./kg. dose, two groups of test animals were administered, in one case orally and in the other intraperitoneally, 1.0 cc. of a solution containing a ratio of 2 mg. of 5-fluorocytosine in 1.0 ml. of water each day. In the case of the intraperitoneal 50 mg./kg. dose, the test animals were injected each day with 1.0 cc. of a solution containing a ratio of 1.0 mg. of 5-fluorocytosine in 1.0 ml. of water. In the case of the oral 200 mg./kg. dose, the test animals received daily, 1.0 cc. of a solution containing a ratio of 4 mg. of 5-fluorocytosine in 1.0 ml. of water. In the case of the oral 500 mg./kg. dose, the test animals received daily 1.0 cc. of a solution containing a ratio of 10 mg. of 5-fluorocytosine in 1.0 ml. of water.

The test results obtained were as follows:

TABLE 2.—THE ACTIVITY OF 5-FLUOROCYTOSINE AGAINST THE *CANDIDA ALBICANS* INFECTION OF WHITE MICE

Infection: 50,000 cells intravenously in mice preconditioned with cortisone
Treatment: 21 days

| Dose, mg./kg. | Route | No. of animals | Kidney cultures | | $CD_{50}$, mg./kg |
|---|---|---|---|---|---|
| | | | Number negative | Number positive | |
| 100 | i.p. | 20 | 10 | 10 | |
| 50 | | 9 | 3 | 6 | 87 i.p. |
| 500 | p.o. | 19 | 10 | 9 | |
| 200 | | 9 | 4 | 5 | |
| 100 | | 9 | 4 | 5 | 302 p.o. |
| Controls | | 39 | 3 | 36 | |

As will be seen from the foregoing table, an appreciable effect was observed when the test animals were treated with the 5-fluorocytosine solutions by intraperitoneal injection and orally.

*Example 2*

In this example, 5-fluorocytosine was formulated into a compressed tablet in the following manner:

42.8 parts by weight of lactose, 41.8 parts by weight of dicalcium phosphate and 10.0 parts by weight of 5-fluorocytosine were intimately admixed. In a separate vessel, an aqueous paste containing 10.0% by weight of gelatinized starch was prepared. The gelatinized starch used was a product which is sold by Corn Products Refining Company, New York, N.Y., under the trade name of Amijel Powder. Thereafter, 3.0 parts by weight of the paste, thus produced, were added to, and mixed with, the lactose-dicalcium phosphate-5-fluorocytosine mixture to form a granulate. The granulate was then comminuted and the finely divided particles, thus obtained, were dried at a temperature of from about 100° F. to 110° F. The dried product was subsequently comminuted and thereafter compressed into tablets using a one-quarter inch flat-faced punch.

*Example 3*

In this example, tablets containing 5-fluorocytosine as the active ingredient were prepared. The method and the adjuvant mixture used in producing the tablets of this example were somewhat different than the method and adjuvant mixture used in producing the tablets of Example 2.

In producing the tablets of this example, a mixture was prepared using 10.0 parts by weight of 5-fluorocytosine, 88.0 parts by weight of lactose and 2.0 parts by weight of calcium stearate. The mixture was, thereafter, comminuted and the finely divided powder was compressed into tablets using a one-quarter inch flat-faced punch.

*Example 4*

Additional 5-fluorocytosine tablets were produced in the following manner: a granulation was first prepared by mixing 27.5 parts by weight of corn starch, 4.5 parts by weight of pre-gelatinized cornstarch and 68.0 parts by weight of lactose. Thereafter, 88.0 parts by weight of the above-described granulation were mixed with 10.0 parts by weight of 5-fluorocytosine and 2.0 parts of calcium stearate. The mixture of subsequently comminuted and compressed into tablets on a one-quarter inch flat-faced punch.

We claim:
1. A method for the treatment of a systemic moniliasis infection in a human patient which comprises administering to the infected patient an effective amount of a composition comprising 5-fluorocytosine and a medicinally acceptable carrier therefor.
2. A method for the treatment of *Cryptococcal meningitis* infection in a human patient which comprises administering to the infected patient an effective amount of a composition comprising 5-fluorocytosine and a medicinally acceptable carrier therefor.
3. A method for controlling fungi which comprises subjecting the host for said fungi selected from the group consisting of animals and plants to the action of a composition comprising 5-fluorocytosine and a carrier thereof.
4. A method of controlling fungi selected from the group consisting of *Candida albicans* and *Cryptococcus neoformans* which comprises subjecting human host for said fungi to the action of a composition comprising 5-fluorocytosine and a carrier thereof.
5. The method of claim 4, wherein said fungi is *Candida albicans*.

References Cited

Cecil et al.: A Textbook of Medicine, W. B. Saunders Company, Philadelphia, Pa. (1955), pp. 335–336.

ALBERT T. MEYERS, *Primary Examiner.*

SAM ROSEN, *Examiner.*

VERA C. CLARKE, *Assistant Examiner.*